United States Patent
Sersland et al.

(10) Patent No.: US 7,331,310 B1
(45) Date of Patent: Feb. 19, 2008

(54) DOMESTIC ANIMAL TRAINING METHOD

(76) Inventors: Ken Sersland, 3949 New Highway 96 West, Franklin, TN (US) 37064; Gary Hedden, 3949 New Highway 96 West, Franklin, TN (US) 37064

( * ) Notice: Subject to any disclaimer, the term of this patent is extended or adjusted under 35 U.S.C. 154(b) by 52 days.

(21) Appl. No.: 11/058,756

(22) Filed: Feb. 16, 2005

(51) Int. Cl.
*A01K 37/00* (2006.01)
(52) U.S. Cl. ..................................................... 119/712
(58) Field of Classification Search .............. 119/712; 369/4, 86, 91, 92; 381/119, 61, 91, 122
See application file for complete search history.

(56) References Cited

U.S. PATENT DOCUMENTS

| | | | | | |
|---|---|---|---|---|---|
| 2,249,606 | A | * | 7/1941 | Friebus ........................... | 369/4 |
| 4,357,492 | A | * | 11/1982 | Campbell et al. ........... | 381/107 |
| 4,412,106 | A | * | 10/1983 | Pavel .......................... | 381/309 |
| 5,684,763 | A | * | 11/1997 | Kurita et al. ............. | 369/13.02 |
| 2002/0181723 | A1 | * | 12/2002 | Kataoka ....................... | 381/92 |
| 2004/0037540 | A1 | * | 2/2004 | Frohlich et al. .............. | 386/96 |
| 2004/0228215 | A1 | * | 11/2004 | Ichikawa et al. ........... | 367/124 |
| 2005/0080616 | A1 | * | 4/2005 | Leung et al. ............ | 704/200.1 |
| 2005/0248651 | A1 | * | 11/2005 | Hirata et al. ............. | 348/14.08 |
| 2005/0249360 | A1 | * | 11/2005 | Adcock et al. ............... | 381/92 |
| 2005/0281410 | A1 | * | 12/2005 | Grosvenor et al. ........... | 381/61 |
| 2006/0136544 | A1 | * | 6/2006 | Atsmon et al. ............. | 709/200 |

OTHER PUBLICATIONS http://www.soundsscary.com Sounds Scary CD Updated information on Dec. 26, 2003 valid until next update on May 24, 2004.*

"If Your Horse Shies on Trails Get the Spook Out at Home" http://equisearch.com/sports/trailriding/eqspook795/.

"Watch Your Horse's Ears When You Ride" http://www.equisearch.com/train/behavprobs/eqears413/index.html.

"Your Horse's Hearing" http://www.equisearch.com/train/behavprobs/eqhearing933/index.html.

"Preparing to Ride in a Parade" http://www.equisearch.com/community/parade042303/index.html.

"How to De-Spook a Spooked Horse" http://petplace.netscape.com/articles/artShow.asp?artID=2128.

"Understanding Why the Horse Spooks" http://members.tripod.com/~HorseChaser/index-9.html.

"On the Road . . . Again!" http://www.carriagedriving.net/features/archives/rcuffey.html.

(Continued)

*Primary Examiner*—Teri Pham Luu
*Assistant Examiner*—Valentina Xavier
(74) *Attorney, Agent, or Firm*—Stephen J. Stark; Miller & Martin PLLC

(57) ABSTRACT

A method of training animals provides for the creation of a recorded track taking into account a plurality of recording techniques for a particular sound source A stationary microphone is utilized to provide a first layer, a moving microphone as utilized to provide a second layer and a pair of microphones proximate to a live animal's ears near a sound source provide three inputs to a mixer. The layers are then mixed and then processed by a processor to provide to a recorder/burner to provide a compact disc in the preferred embodiment. The compact disc is then utilized to train animals for possible exposure to live sound sources at a later time.

17 Claims, 2 Drawing Sheets

OTHER PUBLICATIONS

"A Horse of Course" http://www.pelham-saddlery.com/horse_column/a_horses_ear.html.

"Cowed by Cow Pens" http://www.equisearch.com/sports/cattle/eqcowpens2669/index.html.

"Testing Equine Intelligence" http://www.equisearch.com/magazines/horseandrider/intelligence_081103/index.html.

"Horse Behaviour and Psychology" http://www.horse-behaviour.org.nz/.

Alaska Science Forum, Jan. 19, 1987 "The Bigger Your Skull, The Less You Hear" Article # 804 by Larry Gedney—http://www.gi.alaska.edu/ScienceForum/ASF8/804.html.

"Spook-Proofing a Horse" http://www.equusite.com/articles/riding/ridingSpookProofing.shtml.

"Your Horse's Hearing" http://www.floridahorse.com/hearing.html.

Q&A How to teach a Horse to stop spooking . . . http://www.lemen.com/qa39.html.

"Q&A How can I help My Gelding not to spook?" http://www.animalnetwork.com/horse/detail.aspx?aid=7785&search.

"Horse Training From the Ground Up" http://horse-training.iceryder.net/ground.html.

"Frank Bell Horse Training Philosophy" http://www.horsequest.com/journal/eduacte/fbell.html.

* cited by examiner

DOMESTIC ANIMAL TRAINING METHOD

FIELD OF THE INVENTION

The present invention relates to the training of animals relative to particular sounds, especially domestic animals including horses and dogs, and any animal where densensitivity to particular sounds such as animals being sold at auction, where calm behavior in front of bidders may result in a higher price.

DESCRIPTION OF RELATED ART

Much effort and many books and articles have been written on training horses, dogs and other animals. Prey animals such as dogs, horses, etc., have a Flight Urge which can be aroused when spooked or scared. Spooking can occur from unfamiliar and/or frightening sounds. Animals have been trained with different techniques to resist the Flight Urge.

Trainers have used ear plugs (Ricky Heffner Ph.D.) in animals' ears, live noise sounds including alarms, popping balloons, bull horns, sirens, flapping banners (Jayne Pedigo), sounds in the vicinity of animals in order to attempt to desensitize them to specific sounds, and even sounds recorded on a tape recorder such as barking dogs, horns blaring, etc. (Connie Beckner). Sounds effects tapes with lawn mowers, barking dogs, cows, construction workers, air raids, motorcycles, crowds, etc., purchased at music stores have been used as well (Robyn Cuffey).

The applicants recognize that it is reported that horses and dogs have extended high frequency hearing response, perhaps up to 40 kHz. The CD Audio Disc is limited to frequencies below 20 kHz, and a boom box doesn't typically reproduce (acoustically) frequencies above 15 kHz. My mention of Sampling Frequency of 44.1 kHz should not be confused with a Frequency Response of the recording to 44 kHz. At a Sampling Frequency of 44.1 kHz, audio Frequency Response is limited to approximately one-half of the Sampling Frequency by mathematics attributed to Nyquist. We mustn't claim that our recordings extend to frequencies beyond 20 kHz, because they don't. My decision to use 44.1 kHz Fs (sampling frequency) was because of the intended playback medium (CD audio disc) and playback device (inexpensive portable player).]A disadvantage of utilizing prior art tapes from music stores is that they have been designed to be listened to by humans. Sound effect tapes for humans would not have a need to be mixed to provide a plurality of frequencies to be received by the listener such as if the listener is stationary and if the listener is moving his head from left to right (i.e., Doppler shift of received frequencies) Additionally the frequencies recorded are not provided to microphones positioned at the ears of the intended listening animal. The frequencies received at microphones placed near the ears of animal may be at least slightly different than those received by other microphones, and are believed to be representative of the sounds heard at the ears of that animal.

In many training techniques utilized today, trainers take on the role of the "alpha", or the lead animal of the group. Once this position is established, the animal will trust and submit to the will of the trainer. When trainers perform the act of creating a sound source to desensitize an animal, this can create problems from the trainer-animal relationship. Specifically, if the trainer is the individual to which the animal looks to provide stability and consistency, the act of popping balloons, sounding alarms, shooting gunshots, etc., could, at least temporarily, disturb the relationship between the animal and the trainer.

Finally, when utilizing ear plugs in animals, not only can the animal not hear the sound source to be protected against, but the animal's hearing is also reduced as it relates to commands from the animal owner or trainer. Commands such as "stop," "sit," "go,", "walk", "trot", "whoa" etc., may not be heard by the animal when wearing ear plugs.

Accordingly, a need exists for a method of training animals to be desensitized to particular sounds while still being able to hear sounds is needed.

Another need exists to provide a method of training animals which takes into account the different circumstances under which an animal may receive frequencies related to particular noises.

Another need exists for providing an animal with recorded tracks which have a plurality of layers of a recorded event as it relates to a frequency spectrum to attempt to capture many of the possible frequencies an animal may experience with a particular sound source. Another need exists to begin the desensitizing training in a confined space, such as a stall in a barn, where the Flight Urge is manageable. Our product is the only training technique that can be practiced in the stall.

SUMMARY OF THE INVENTION

Accordingly, it is an object of the present invention to provide a method of training animals which includes providing an improved mix of sound layers to the animal under controlled circumstances.

It is another object of the present invention to provide a method of training animals which includes combining several tracks overlaid with one another for one or more events to maximize the training experience and to account for various circumstances which may occur.

Accordingly, a recording is made of sounds for use in training animals. Specifically, depending on the environment that the animal is going to be exposed to such as a parade or where various parade sounds would be heard, hunting where gunshots, the flushing of birds, rattlesnakes, wild animals, thunderstorms, farm tractors and/or farm animals might be heard, etc. A recording is made using the method as described below.

When making the recording, a number of microphone techniques are utilized. Specifically, a fixed position mid-side stereo microphone technique is first utilized. This provides a first layer for a final mix of sounds. Next, a hand-held, moving stereo microphone technique can be employed. This is often utilized to simulate the way sounds are heard by animal when the animal turns his head in response to a source. Finally, a two-channel spaced-omni wireless microphone technique may be employed in which two microphones are placed on a live animal's head near his ears. These microphones receive a signal almost identical to what the animal hears.

After obtaining the various tracks of a particular subject such as a firecracker explosion, gunshot, or other subject, the individual sound images are digitally mixed and edited into a composite audio scene. The various microphone techniques are overlaid with one another and various quantities of a particular sound and various sounds can be mixed together on a single stereo track to provide an aesthetic balance of realism, intensity, shock, and/or time efficiency for training sessions with a particular animal.

Next, a signal processing and mastering of the stereo track can be performed to accomplish a maximum benefit when a compact disc is played on inexpensive equipment such as a "boom box." Applications of amplitude compression and limiting, stereo image width enhancement, frequency response equalization, and/or spectral filtering can be employed. Preferably a digital work station employing 32-bit floating point processing can be utilized to maintain maximum signal integrity to produce a recording that is then bit-depth-reduced and dithered to 16 bit samples for creation of a Red Book Standard audio compact disc (CD). Other storage media may also be used.

After creating the disc, the disc can then be played at a particular volume for a trainer to desensitize a particular animal to given sounds. The playing of the tracks can happen in a variety of training locations including (for horses) the stall, barn, round pen, and arena. These locations are much more easily accessible and controllable than the "field" locations where the original scary sounds might be experienced. The dynamic range of acoustic sources can be made of a particular amplitude on the recording (i.e., a gunshot may be heard at the same volume as an air brake release for a given volume setting of the play back device such as the boom box, even though one of the events may be louder than the other depending on a number of factors including distance from the sound source).

Additionally, the CD tracks preferably have layer upon layer of recordings playing simultaneously so that a trainer teaches several if not many related or unrelated sounds in a very short period of time. By utilizing the signal processing techniques, maximum acoustic output can be achieved from any expected playback equipment, so that a training experience can be as close to reality as possible while taking into account various circumstances, such as movement of the animals head during a sound event, a still animal during a sound event, and even sound received by the animal's ears during a sound event.

Because of the nature of the sound, specifically that it migrates through air, the CD audio is audible throughout the training areas. The animal being trained may be unable to locate the source of the training sounds from the CD, thus making them even more scary and realistic. The Flight Urge is somewhat increased if the location of the source of sound is unknown to the animal. This is believed to enhance the training experience with the range of recordings provided to the animal.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

[Gary asks: should the diagram show that the three types of microphone techniques and their associated recordings each take place at a different time? The recording of sound sources (in two-channel stereo) has actually taken place over a period of years. The resultant stereo digital audio files are collected, edited, and assembled in a Digital Audio Workstation (DAW). Then (at a later time) they are mixed and processed into a single stereo audio "composite". Then (at a later time) they are processed and mastered for the Compact Disc.

Figure 1:
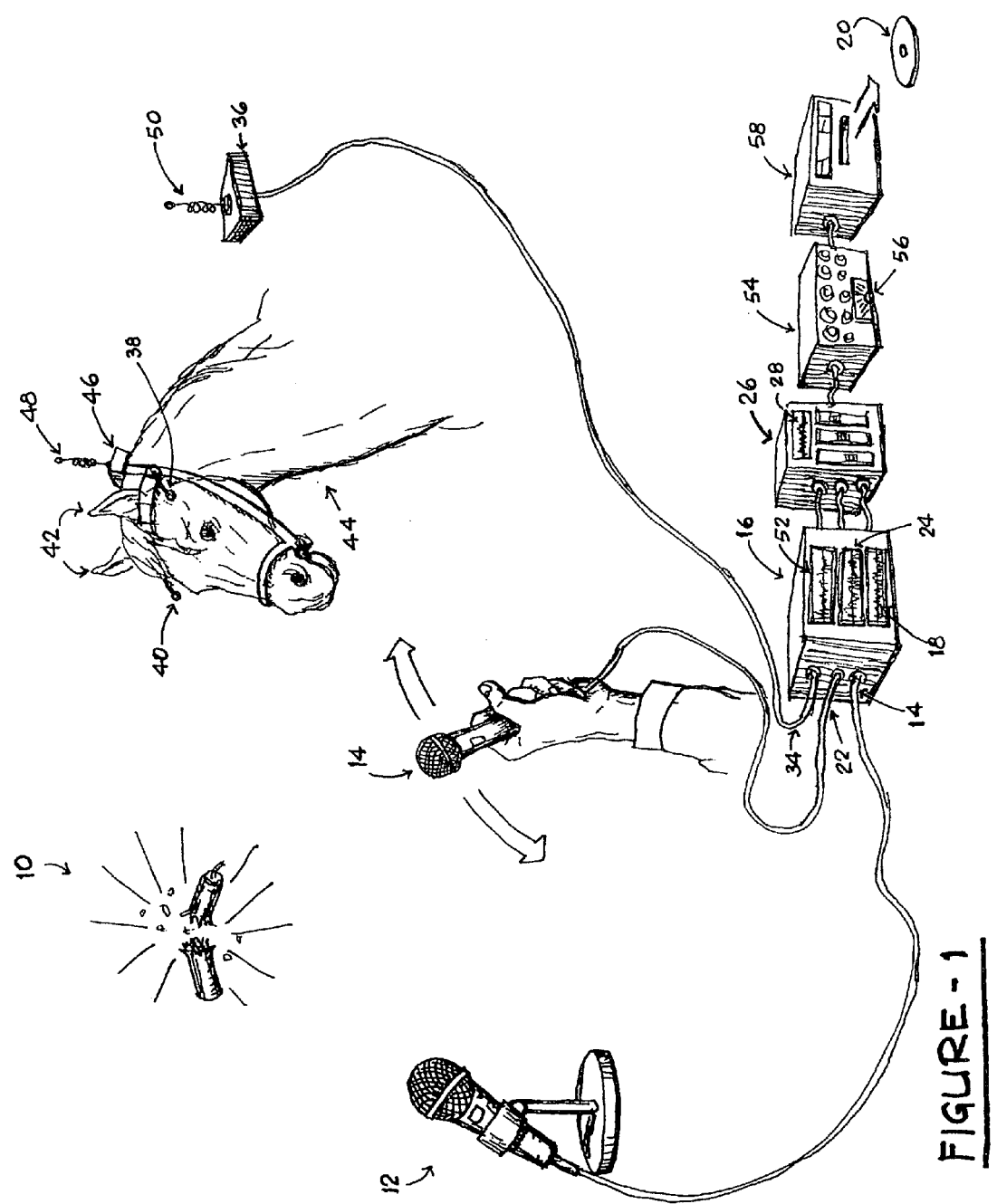
FIG. 1 is a diagrammic representation of a presently preferred method of creating a recording of a sound source in accordance with the present invention.

FIG. 1 shows in a diagrammic form the method of the presently preferred embodiment of the present invention. At least one sound source 10 such as the exploding firecracker illustrated creates a sound source 10 to be recorded. Other sound sources could include: air brakes, air tools and compressors, aluminum bleachers (children screaming and running on them), auctions, bagpipes and drums, big cats and elephants, big truck braking (engine brake), braches snapping and rocks falling, building implosion, calliope, cannon, cans rattling, car alarms, cars and trucks, chainsaws, chaos/mayhem/riot scene, children and babies screaming, city busses, construction tools, crop duster airplane, crowds cheering, dirt bikes, dog whistles, dogs barking, driving show class (arena competition and crowd sounds), English arena class ride (arena competition and crowd sounds), farm animals, farm tractors, farrier and blacksmith, firecrackers, fireworks, four wheeler, glass breaking, gun shots, heavy duty construction equipment, helicopters, horns, horse show stable ambience, horse-drawn vehicles, horses galloping, horses on roads, jackhammer, jets, lawn mowers, marching bands, metal gates, motorcycles, mountain bikes, noisy fan motor, noisy horse trailer on road (horse perspective inside), parade ride (all varieties of parade sounds), quail flushing, rattlesnake, rodeo and roping (competition scene), show organ (horse perspective in arena), sirens, slamming doors, sleigh bells, steel wheel vehicle (horse-drawn), stone boat (horse-drawn training vehicle), taps (bugle performance), recall (bugle performance and other tunes), tarp and flag (blowing and flapping), thunderstorm (thunder, wind and rain), trail ride (complex scene from horse perspective), trains, Western arena class ride (competition and crowd backgrounds), wild animals, wild turkeys flushing, waterfalls, whinnies, whips and wood bridges (crossing over mountain stream), etc. Still other sound sources may also be recorded.

When recording the sound source(s) 10, a first fixed position microphone 12 is preferably utilized to provide a first input 14 which is shown on analyzer 16 at first display 18. When utilizing a fixed position microphone also known as fixed-position, mid-side stereo microphone technique, sound sources 10 such as those that are stationary or those that are moving may be recorded. The resulting sound first input 14 is provided at image 18 can be utilized as a first layer and/or for background in a final mix of sounds on compound disc 20 as will be described in further reference to the drawings and below. Accordingly, when providing a background as a first layer, a steady sound field against which moving sources can be placed can be provided. Examples of backgrounds include storms, wind, bees' nests, city ambiance, etc.

The fixed position microphone 12 could also be utilized to record a first layer in a final mix. The fixed position microphone shown recording sound source 10 such as the exploding firecracker can be mixed with other layers from other recording sources for a final track to be provided on a compact disc as will be described below. The first input 14 may be stored until a plurality of other inputs are available to be mixed with the first input 14 to provide a final training track.

The second recording of source 10 is illustrated is in the form of a moving microphone 14. The moving microphone 14 provides second input 22 as used on the analyzer 16 as can be shown by visual display 24. The second input 22 from the moving microphone 14 can then be mixed in the mixer 26 with the first input 14 to provide a stereo track which is visualized at display 28 on the mixer. The analyzer 16 may be the input into the mixer 26, or other portion of the mixer 26, or workstation. This moving microphone technique may be used to create Doppler shift relative to the first input of a same sound source 10 to simulate the way sounds are heard by an animal when his head turns in response to a sound source 10. By moving the microphone in a manner similar to what is observed as an animal's head turns in fright, the resultant layer has encoded image shift and Doppler pitch shifting. In addition, this technique facilitates following the actions of moving sound sources, such as falling rocks, mountain bikes, motorized vehicles, etc. The second input 22 may be stored until a plurality of other inputs are available to be mixed with the second input 22 to provide a final training track.

Another input 34 provided to analyzer 16 is provided in the preferred embodiment from receiver 36 which receives a transmission from microphones 38,40 which are placed proximate to the ears 42 of an animal 44 such as the type animal to be trained with the disc 20. This is also known as two-channel spaced-omni wireless microphone technique. The two microphones 38,40 are attached to a live animal's head near his ears 42 as illustrated. Different locations of the placement of microphones 38,40 relative to the ears 42 may also be utilized and there may be other proximate locations to the ears 42 which are as desirable if not more desirable than the illustrated location in FIG. 1 for the illustrated animal 44 and other animals 44.

The signals received by the microphone 38, 40 are preferably transmitted by a transmitter 46 such as by using antenna 48 to receiver 36 such as through antenna 50. Signal sent from receiver 36 are provided as the third input 34 into the analyzer 16. This third input 34 is displayed as third layer display 52. This technique permits a realistic representation of what the animal hears and is useful when the specific sonic situation involves true interaction by the animal, as in during equine arena competition and trail riding. The third input 34 may be stored until a plurality of other inputs are available to be mixed with the third input 34 to provide a final training track.

Although only three layer displays 18,24,52 are shown in FIG. 1, it can be understood by one skilled in the art that at least two of these three are necessary to be mixed into the track as provided at display 28. Additional recorded layers can be mixed into the track 28 as well provided from additional and/or other inputs.

The mixer 26 mixes the individual stereo recordings and the layers to provide a mixed track, preferably on top of one another. The mixer 26 may allow for digital and/or analog editing. Digital editing is preferred in the preferred embodiment. A composite audio scene 28 is displayed as a single stereo track. Although only three individual sound images 18,24,52 are combined to provide the track 28 as illustrated, it should be understood by one skilled in the art as many as several hundred individual recordings can be combined into a single track 28. The track 28 can then be tested and approved by trainers. Accordingly, an aesthetic balance of realism, intensity, shock and time-efficiency between sessions can be achieved through this mixing technique.

Figure 2:
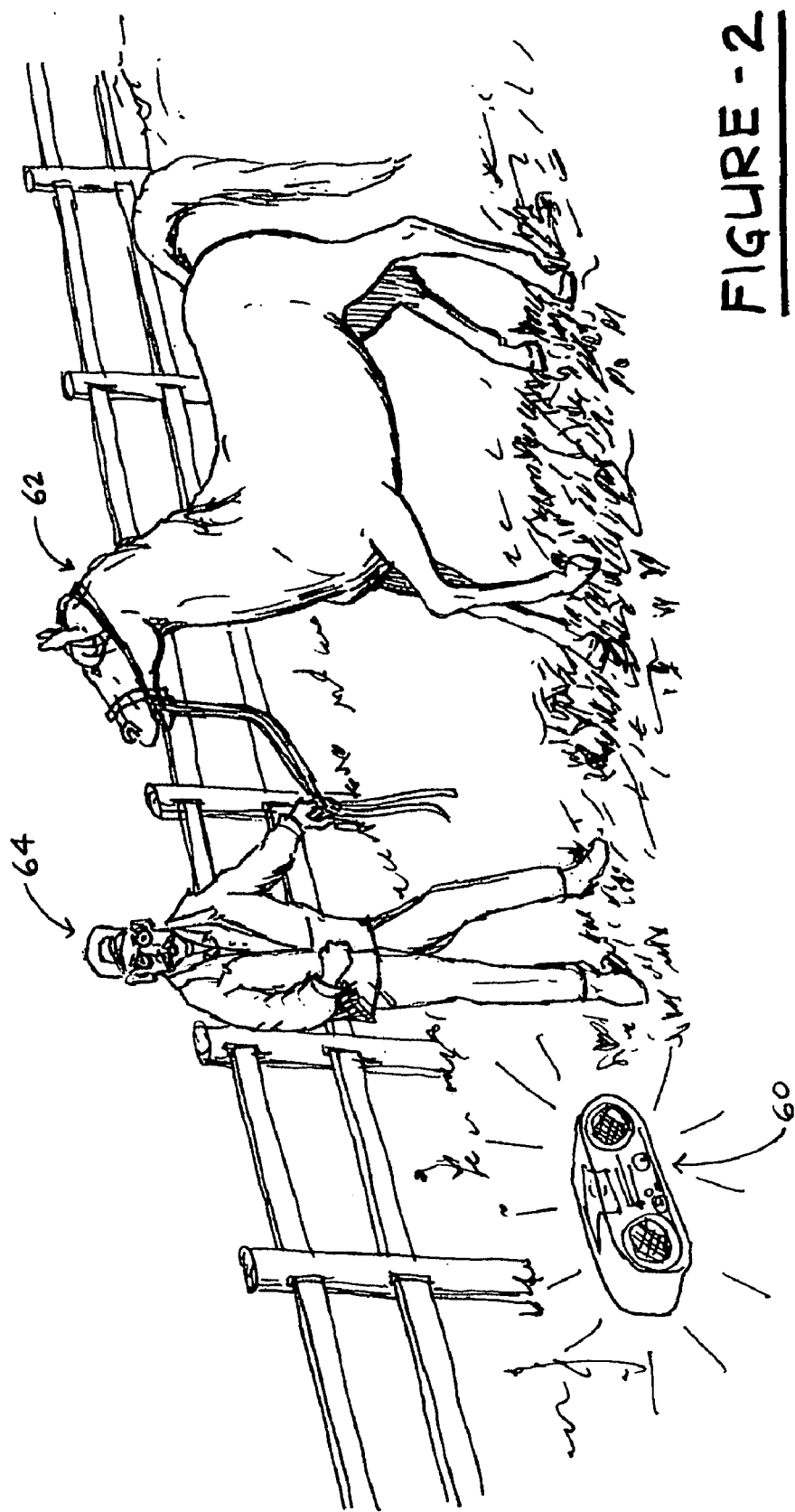
FIG. 2 illustrates the compact disc created in FIG. 1 being utilized to train an animal.

After providing a suitable track, signal processor 54 is useful to process the track 28 to provide a maximum benefit as a final track for a compact disc 20 or other storage media when played on inexpensive equipment such as a "boom box". The various signal processing steps could include one or more applications of amplitude compression and limiting, stereo image width enhancement, frequency response equalization, and/or spectral filtering. The processor 50 utilized in the preferred embodiment is a digital audio work station employing 32-bit floating point processing which has been found useful to maintain maximum signal integrity. The display 56 of a recording has been bit-depth-reduced and dithered to 16 bit stereo samles for replication as a Red Book Standard Audio Compact Disc. Disc drive 58 or other production equipment, can be utilized to produce disc 20 or other media in FIG. 1 in this manner. Accordingly, the disc 20 or other digital media contains a recording of a mixed track 28 of a sound source 10 from various microphone techniques such as and/or those illustrated. After making disc 20 then the disc is placed in a disc player 60 as shown in FIG. 2 in the presence of an animal 62 to be trained as will be described in further detail below.

As a result of the recording, mixing and processing technique, a high quality recording can be achieved. A consistent playback volume can be achieved regardless as to the particular sound source 10 utilized so that the trainer can set the particular play back volume control on the audio components 60 and work with the animal 62. The dynamic range of acoustic sources may be greatly reduced in some instances so that a gunshot can be provided at the relatively same volume as an air brake release by a particular volume setting on the audio component 60.

The compact disc 20 preferably thus have layer upon layer of recordings 18,24,52 playing simultaneously from the audio components 60 to the animal 62. In a relatively short period of time the various sounds which could be experienced by the animal 62 in a life-like scenario can thus be duplicated through the training method described herein. The signal processing step has been found to provide a maximum acoustic output from inexpensive playback equipment so that the training experience can be as close to reality as possible with relatively inexpensive audio equipment 60.

The audio recording format is preferably a 24-bit pulse code modulation (PCM) at a sampling frequency of 44.1 KHz. While a higher sampling frequency could be utilized, it is not believed that it would significantly improve the effectiveness of the final product under current standards since the compact disc will be provided in Red Book CD format to be played in conventional equipment as is now currently sold. Of course, if higher quality equipment is made available to the masses, higher quality recordings could be provided. The 24-bit-depth resolution supports the extensive single processing applied to individual recordings for providing this final product. It will also be understood that all recordings are preferably recorded in stereo (two-channel).

When playing sounds from the audio components 60 which could potentially spook or frighten the animal 62 such as the horse, dog or other animal to be trained, especially with dogs and horses it is important that the trainer 64 remain the "alpha," a source of security and comfort. The advantages of this technique is as alpha with this training method, the trainer is not the individual shooting the gun, firing the firecracker, or creating the potentially spooking sound. As alpha and all humans around the animal 62 consistency is maintained, which is not the case if you make spooking sounds without a CD.

When choosing the audio components 60, the better quality of equipment, the better the training environment for the animal 62. It is recommended that a boom box having at least 4-inch diameter speakers and using at least four or more battery cells (C or D) or higher to be utilized. Batteries should be kept fresh if AC power is not utilized as weak batteries can cause audible distortion even at low volumes. If the speakers are separable from the player, it is recommended they be spread out as far as possible. Furthermore, if bass boost feature is available, this feature may enhance the play back as mixed in the preferred embodiment. Moving and relocating the loudspeakers periodically may enhance the training experience. Additional playback devices playing different tracks of the CDs may enhance the training experience by the accumulation of more sounds and more locations. When utilized with a permanent installation a surround system with subwoofer capability has even been found to be very effective. Surround sound systems are also capable of being utilized with the disc 20 since additional spatial information is provided on the disc 20 which can be utilized in that feature through use of the processor 28.

It is preferred that the volume from the audio components 60 be started at a low volume and the trainer 64 remain close to the animal 62 for a source of stability and security. A reduced fear reaction is to be encouraged when the animal 62 hears the frightening sounds from the audio component 60. It has been found helpful to repeat or loop tracks from the audio component 60 that are bothersome for the animal 62. As the animal's reaction diminishes over time, the playback volume from the audio component 60 can be increased preferably in small increments. Once the animal 62 is successful in ignoring the sounds at high volumes, the training will then be deemed to be successful. It is important to avoid playing the CD so loud as to create distorted sounds. Furthermore, if the audio component 60 has repeat loops select and shuffle features that have been found useful in many training applications.

When the animal 62 shows that he or she is comfortable with the sounds, the audio components 60 can be utilized in the trainer's presence while grooming, tacking up, saddling up and riding. Furthermore, the sounds from the audio component 60 can be played even when the horse is alone day or night and at any volume. It has been found that sound conditioning is a repetitive learning process with long term benefits. Furthermore, while grown animals 62 can be habitually trained with this method, imprinting newborn animals with these sounds has been found particularly effective to desensitize them from frightening sounds.

The newly born animal 62 can be subjected to these discs 60 played at a low volume for the audio component 60 from the very beginning. Furthermore, these discs 20 can be played just about anywhere, in the barn, throughout the stable and aisles, grooming in the cross ties, tacking up, lunge lining in a round pen, outdoor/indoor arena training, harnessing for driving, ground driving, arena vehicle driving, on the seat in driving vehicles, mounted patrol tacking up, mounted patrol situational training, and anywhere canine training is conducted, or any other particular animal is to be trained. Preparing animals for auctions can also be beneficial. The steadier animals at auction often command higher prices. This includes cattle, sheep, goats, horses, etc.] It has been found that the training method is particularly effective when the trainer is available as a source of comfort and safety until the animal 62 becomes immune to the sounds.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An animal training method comprising: in the presence of a fixed microphone, a moving microphone, and at least one microphone placed near an ear of a live animal with the at least one microphone placed near an ear of a live animal, providing a sound source near the animal;
   using the fixed microphone to record a first layer of the sound source;
   using the moving microphone to record a second layer of the sound source, said second layer experiencing a Doppler shift relative to the first layer;
   using the at least one microphone to record a third layer with output from the at least one microphone is transmitted to a receiver before being provided as the third layer;
   mixing the third layer with the first and second layers to form a mixed track;
   recording a final track derived from the mixed track on a storage device; and
   playing the final track from the storage device in the presence of an animal to be trained for the purpose of desensitizing the animal to the sound source with the animal to be trained being a similar type of animal as the live animal.

2. The animal training method of claim 1 further comprising the step of:
   processing the mixed track with one more applications selected from the group of amplitude compression and limiting, stereo image width enhancement, frequency response equalization, and spectral filtration to provide the final track before recording the track on a storage device.

3. The animal training method of claim 2 wherein the step of processing the mixed track is performed with a digital workstation and the storage device is a digital storage medium.

4. The animal training method of claim 3 wherein the digital storage medium is a compact disc.

5. The animal training method of claim 1 wherein the first and second layers have at least some slightly different frequencies.

6. The animal training method of claim 1 wherein the at least one microphone is further comprised of first and second microphones proximate respectively to two ears of the live animal.

7. An animal training method comprising:
   selecting at least a first microphone from the group of a stationary and a moving microphone;
   in the presence of a first and at least a first and second second microphone proximate respectively to two ears of a live animal, providing a first sound source;
   using the first microphone to record a first layer of the sound source;
   with the at least the first and second second microphone located proximate to the ear of a live animal of a type to be trained, recording a second layer of a second sound source with the at least one second microphone;
   mixing the first and second layers together to form a mixed track;
   recording a final track derived from the mixed track on a storage device;
   playing the final track from the storage device in the presence of an animal to be trained for the purpose of desensitizing the animal to the sound source.

8. The animal training method of claim 7 wherein the first microphone is a stationary microphone and further comprising the steps of:

provniding a moving microphone relative to the first sound source thereby imparting a Doppler shift to the moving microphone as recorded on a third layer;

and mixing the third layer with the first and second layers.

9. The animal training method of claim 8 wherein the moving microphone imparts a Doppler shift to the second layer relative to the first layer.

10. The animal training method of claim 7 wherein the first and second second microphones providing an output to a transmitter located on the animal which is received by a receiver providing the second layer.

11. The animal training method of claim 7 wherein the animal to be trained is of the same type of animal as the live animal.

12. The animal training method of claim 7 wherein the first and second layers are mixed atop one another to form the mixed track.

13. The animal training method of claim 7 further comprising the step of:

processing the mixed track with one more applications selected from the group of amplitude compression and limiting, stereo image width enhancement, frequency response equalization, and spectral filtration to provide the final track before recording the track on a storage device.

14. The animal training method of claim 7 wherein the first and second sound sources are created from one of the same event and source.

15. An animal training method comprising: in the presence of a fixed microphone, a moving microphone, and at least a first and second microphone placed near ears of a live animal, providing a sound source near the animal;

using the fixed microphone to record a first layer of the sound source;

using the moving microphone to record a second layer of the sound source, said second layer experiencing a Doppler shift relative to the first layer;

using the first and second microphone to record a third layer;

mixing the third layer with the first and second layers atop one another to form a mixed track;

recording a final track derived from the mixed track on a storage device; and playing the final track from the storage device in the presence of an animal to be trained for the purpose of desensitizing the animal to the sound source.

16. The animal training method of claim 15 further comprising the step of:

processing the mixed track with one more applications selected from the group of amplitude compression and limiting, stereo image width enhancement, frequency response equalization, and spectral filtration to provide the final track before recording the track on a storage device.

17. The animal training method of claim 15 wherein the third layer is mixed atop the first and second layers forming the mixed track.

* * * * *